United States Patent
Kim et al.

(10) Patent No.: US 11,220,232 B2
(45) Date of Patent: Jan. 11, 2022

(54) RAMP OF CURTAIN AIRBAG DEVICE AND CURTAIN AIRBAG DEVICE HAVING THE SAME

(71) Applicant: HYUNDAI MOBIS CO., LTD., Seoul (KR)

(72) Inventors: Ju Kyung Kim, Yongin-si (KR); Hyung Ho Je, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/000,347

(22) Filed: Aug. 23, 2020

(65) Prior Publication Data
US 2021/0094500 A1      Apr. 1, 2021

(30) Foreign Application Priority Data

Sep. 26, 2019   (KR) .......................... 10-2019-0118666

(51) Int. Cl.
| | | |
|---|---|---|
| *B60R 21/232* | (2011.01) | |
| *B60R 21/215* | (2011.01) | |
| *B60R 21/201* | (2011.01) | |
| *B60R 21/217* | (2011.01) | |
| *B60R 21/237* | (2006.01) | |

(52) U.S. Cl.
CPC .......... *B60R 21/232* (2013.01); *B60R 21/201* (2013.01); *B60R 21/215* (2013.01); *B60R 21/217* (2013.01); *B60R 21/237* (2013.01)

(58) Field of Classification Search
CPC ... B60R 21/232; B60R 21/215; B60R 21/213; B60R 21/201; B60R 2021/161; B60Y 2306/09

USPC .......................................... 280/730.2, 728.2
See application file for complete search history.

(56) References Cited

U.S. PATENT DOCUMENTS

| | | | | |
|---|---|---|---|---|
| 7,654,559 | B2 * | 2/2010 | Hidaka | B60R 21/213 |
| | | | | 280/728.2 |
| 9,573,550 | B1 * | 2/2017 | Mitchell | B60R 21/213 |
| 2004/0108693 | A1 * | 6/2004 | Foster | B60R 21/213 |
| | | | | 280/730.2 |
| 2006/0119084 | A1 * | 6/2006 | Coon | B60R 21/2338 |
| | | | | 280/730.2 |
| 2010/0127484 | A1 * | 5/2010 | Son | B60R 21/213 |
| | | | | 280/730.2 |

(Continued)

FOREIGN PATENT DOCUMENTS

| | | | | |
|---|---|---|---|---|
| KR | 20120020967 | A | * | 3/2012 |
| KR | 20120039262 | A | * | 4/2012 |
| KR | 20120051332 | A | * | 5/2012 |

*Primary Examiner* — Keith J Frisby
(74) *Attorney, Agent, or Firm* — H.C. Park & Associates, PLC

(57) ABSTRACT

A ramp of a curtain airbag device including: a ramp body part on or into which a folded cushion is seated or inserted; one or more vehicle body mounting parts formed at a lower part of the ramp body part, and coupled to a vehicle body; one or more tab through-hole parts formed through the ramp body part, such that a mounting tab part of the cushion is passed through the tab through-hole part; and one or more locking hook parts formed at an upper part of the ramp body part, such that an end of the mounting tab part extended upward between the vehicle body and the ramp body part through the tab through-hole part is locked to the locking hook part.

12 Claims, 7 Drawing Sheets

SECTION B-B'

(56) References Cited

U.S. PATENT DOCUMENTS

| | | | |
|---|---|---|---|
| 2012/0299276 A1* | 11/2012 | Hayashi | B60R 21/232 |
| | | | 280/730.2 |
| 2013/0300091 A1* | 11/2013 | Kim | B60R 21/213 |
| | | | 280/728.1 |
| 2019/0047505 A1* | 2/2019 | Hioda | B60R 21/2334 |
| 2019/0092265 A1* | 3/2019 | Kakimoto | B60R 21/201 |

* cited by examiner

SECTION A-A'

SECTION B-B'

RAMP OF CURTAIN AIRBAG DEVICE AND CURTAIN AIRBAG DEVICE HAVING THE SAME

CROSS-REFERENCE TO RELATED APPLICATION

This application claims priority from and the benefit of Korean Patent Application No. 10-2019-0118666, filed on Sep. 26, 2019, which is hereby incorporated by reference for all purposes as if set forth herein.

BACKGROUND

Field

Exemplary embodiments relate to a ramp of a curtain airbag device and a curtain airbag device having the same, and more particularly, to a ramp of a curtain airbag device, which is installed in a vehicle to protect a passenger in case of a vehicle collision, and a curtain airbag device having the same.

Discussion of the Background

An airbag device for a vehicle refers to a safety device that reduces an impact applied to a passenger by inflating a cushion when a collision accident occurs. The airbag device may be divided into DAB (Driver Air Bag), PAB (Passenger Air Bag), SAB (Side Air Bag) CAB (Curtain Air Bag) and RAB (Roof Air Bag).

Since the curtain airbag device covers door glass when deployed downward from an upper vehicle body such as a roof, the curtain airbag device looks likes a curtain installed on a window, and thus has such a name. The curtain airbag device is deployed from side surfaces of front and rear seats, and protects the head and upper body of a passenger.

In the related art, a ramp for holding a cushion of the curtain airbag device at a preset position includes a mounting part formed at the lower part thereof so as to be coupled to the vehicle body and a hole into which a mounting tab of the cushion can be fitted. According to such a structure, the rigidity of the ramp is reduced. In order to reinforce the rigidity, the thickness of the structure may be increased, or a reinforcement structure such as a rib may be accompanied. In this case, the weight and unit price thereof are increased. Furthermore, as the ramp and the vehicle body are contacted with each other, noise may be generated during driving. Therefore, there is a need for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to a ramp of a curtain airbag device and a curtain airbag device having the same, which can stably hold a cushion, reduce the weight and cost thereof, and reduce noise generated by contact between the ramp and a vehicle body.

In an embodiment, a ramp of a curtain airbag device may include: a ramp body part on or into which a folded cushion is seated or inserted; one or more vehicle body mounting parts formed at the lower part of the ramp body part, and coupled to a vehicle body; one or more tab through-hole parts formed through the ramp body part, such that a mounting tab part of the cushion is passed through the tab through-hole part; and one or more locking hook parts formed at the upper part of the ramp body part, such that an end of the mounting tab part extended upward between the vehicle body and the ramp body part through the tab through-hole part is locked to the locking hook part.

The ramp body part may include: a ramp base part facing the vehicle body, and having the tab through-hole part formed therethrough; a cushion support part formed at the lower part of the ramp base part so as to protrude to the inside of the vehicle, and having the cushion seated thereon; and a cushion holding part formed at the upper part of the ramp base part so as to protrude to the inside of the vehicle, configured to form a space between the cushion support part and the cushion holding part, into which the cushion is inserted, and abutting on the upper part of the cushion.

The cushion holding part may be disposed at a middle portion of the ramp base part in a front-to-rear direction, and the locking hook part may be disposed on at least one side of front and rear sides of the ramp base part so as to be spaced apart from the cushion holding part.

The vehicle body mounting part may include: a mounting body formed at the lower part of the ramp body part so as to be extended downward, and abutting on the vehicle body; and a fixing hole formed through the mounting body, and fastened by a fastening member so as to be fixed to the vehicle body.

The tab through-hole part may include: a tab extension hole formed through the ramp body part; and one or more upward guides formed on one or more of the upper part and bottom of the tab extension hole so as to be upward inclined toward the vehicle body.

The locking hook part may include: a locking bump formed at the upper part of the ramp body part so as to protrude to the inside of the vehicle; and an unfolding prevention bump formed at an end of the locking bump so as to protrude downward, such that an end of the mounting tab part is fitted and locked between the locking bump and the ramp body part.

The ramp may further include one or more contact protrusions formed on the ramp body part so as to protrude toward the vehicle body, and abutting on the vehicle body under the tab through-hole part.

In an embodiment, a curtain airbag device may include: one or more ramps each comprising one or more vehicle mounting parts formed at the lower part of a ramp body part, one or more tab through-hole parts formed through the ramp body part, and one or more locking hook parts formed at the upper part of the ramp body part; and a cushion comprising a cushion body part folded and seated on or fitted into the ramp body part, and one or more mounting tab parts each extended between the vehicle body and the ramp through the tab through-hole part, and locked to the locking hook part.

The mounting tab part may include: a tab body coupled to the cushion body part, and extended upward between the ramp and the vehicle body through the tab through-hole part; and a locking hole formed through an end of the tab body, and locked to the locking hook part.

The cushion may further include one or more strap parts coupled to the cushion body part, and configured to cover the circumference of the cushion body part folded with the mounting tab.

The strap part may include: a strap body coupled to the cushion body part, extended to cover one side of the cushion body part, facing the inside of the vehicle, and crossing the mounting tab part extended toward the tab through-hole part; and a tab cross hole formed through a portion of the strap body, which crosses the mounting tab part, such that the mounting tab part passes through the tab cross hole.

The cushion may further include one or more fabric ramps coupled to the cushion body part, and extended to cover one side of the cushion body part, exposed to the outside of the ramp.

In accordance with the embodiment of the present disclosure, the mounting tab part of the cushion may be passed through the tab through-hole part of the ramp, and locked and fastened to the locking hook part formed at the upper part of the ramp, thereby stably preventing the movement of the cushion body part mounted on the ramp.

Furthermore, the mounting tab part formed of a fabric material or the like may be extended between the ramp and the vehicle body, thereby preventing direct contact or friction between the ramp and the vehicle body which are formed of synthetic resin or metal. Therefore, the mounting tab part can prevent noise from being generated by the contact between the ramp and the vehicle body, while serving as a buffer between the ramp and the vehicle body.

In accordance with the embodiment of the present disclosure, as the tab through-hole part is disposed at a position which is clearly spaced apart from the lower part of the ramp body part having the vehicle body mounting part formed thereon, the rigidity of the lower portion of the ramp including the vehicle body mounting part can be stably secured. Therefore, the thickness does not need to be increased, and a separate rigidity reinforcement structure such as a rib may be omitted, which makes it possible to reduce the weight and cost thereof.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
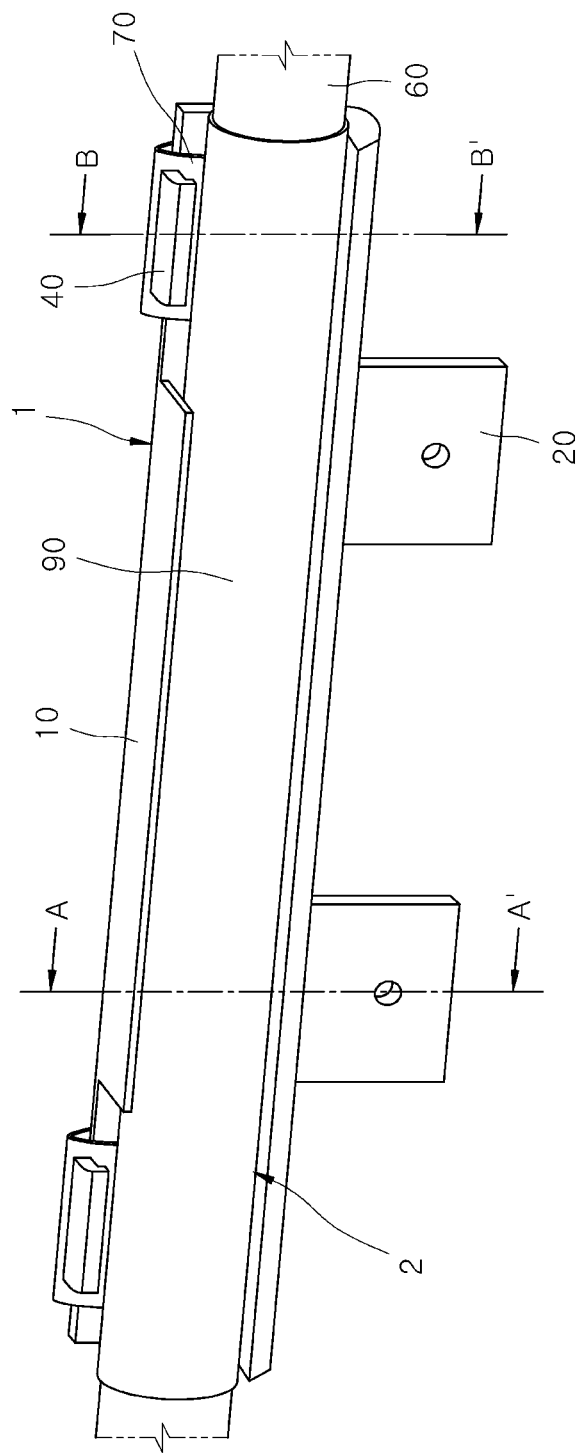
FIG. 1 is a perspective view schematically illustrating a curtain airbag device in accordance with an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

FIG. 1 is a perspective view schematically illustrating a curtain airbag device in accordance with an embodiment of the present disclosure.

Referring to FIG. 1, the curtain airbag device in accordance with the embodiment of the present disclosure includes a ramp 1 and a cushion 2.

Figure 3:
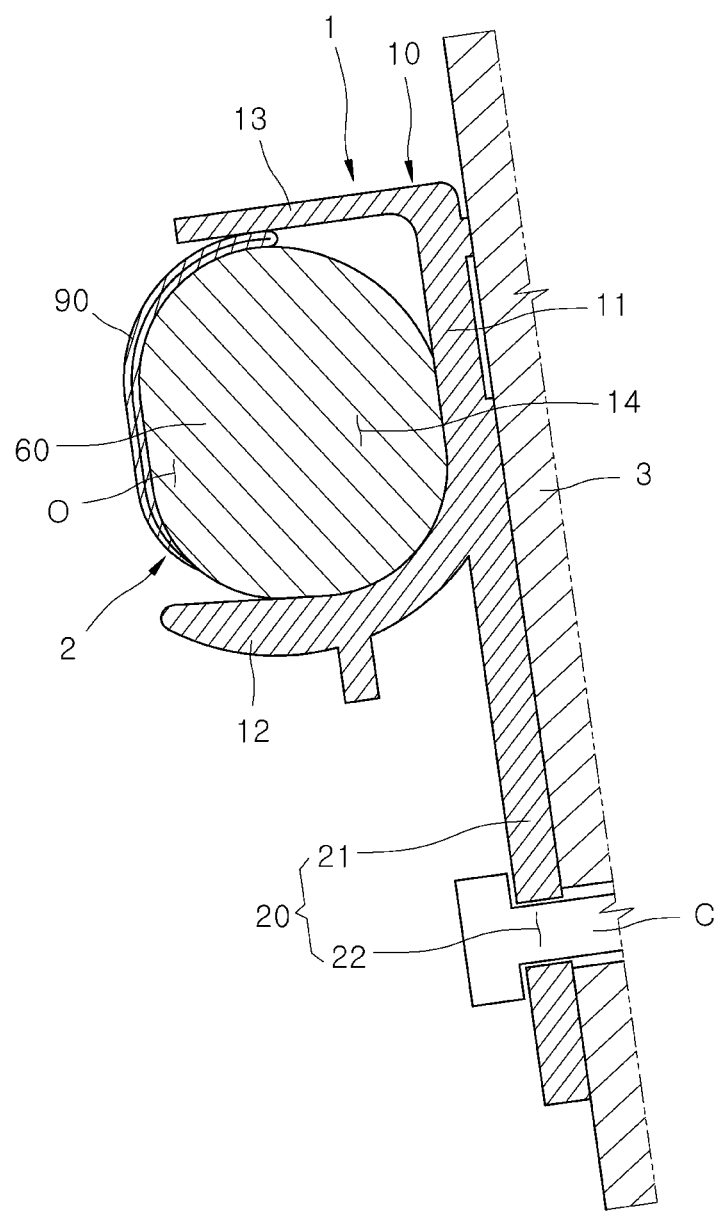
FIG. 3 is a cross-sectional view taken along the line A-A' of FIG. 1.
Figure 4:
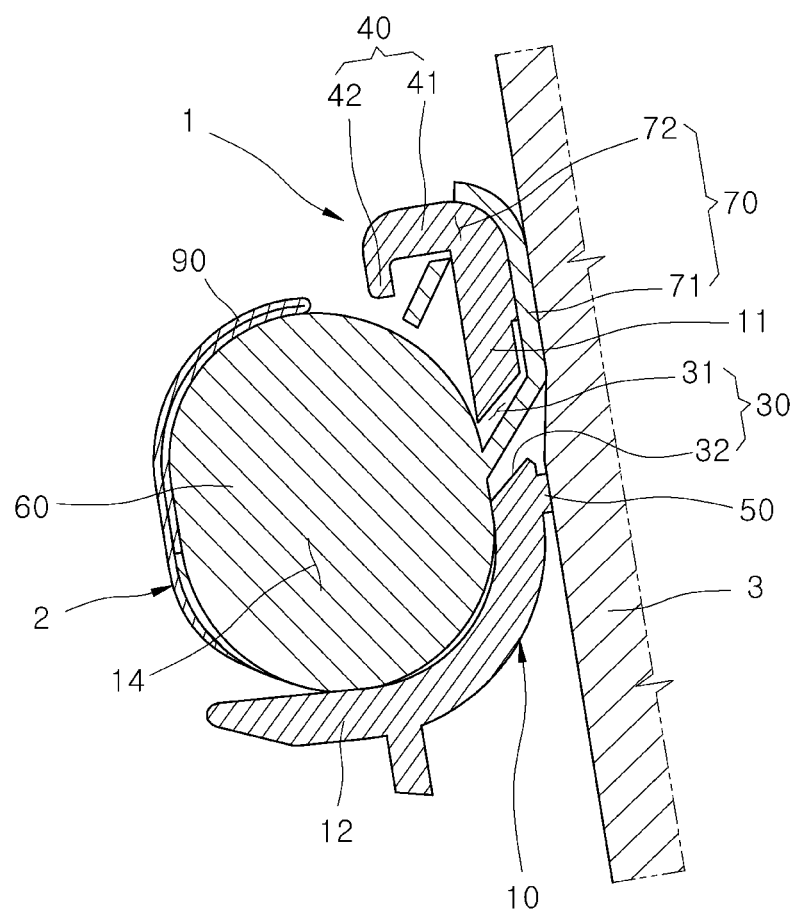
FIG. 4 is a cross-sectional view taken along the line B-B' of FIG. 2.

The ramp 1 is a part for guiding the cushion 2 to be deployed in a preset direction, while mounting the cushion 2 at a preset position of a vehicle body 3 (see FIGS. 3 and 4). The ramp 1 has a bracket structure capable of supporting a middle portion of the cushion 2 folded in a shape to extend in a front-to-rear direction (side-to-side direction in FIG. 1), and is fixedly installed on the vehicle body 3.

The cushion 2 is a part for forming an air cushion to protect the head and upper body of a passenger (not illustrated), and is extended in the front-to-rear direction of a vehicle (with no reference numeral), and folded and disposed at a side top of the passenger. In case of a collision accident of a vehicle, the cushion 2 is inflated downward by gas injected from an inflator (not illustrated) and deployed to a preset width in the upper-to-lower direction. The cushion 2 is installed with the middle portion thereof, supported by the ramp 1.

Figure 2:
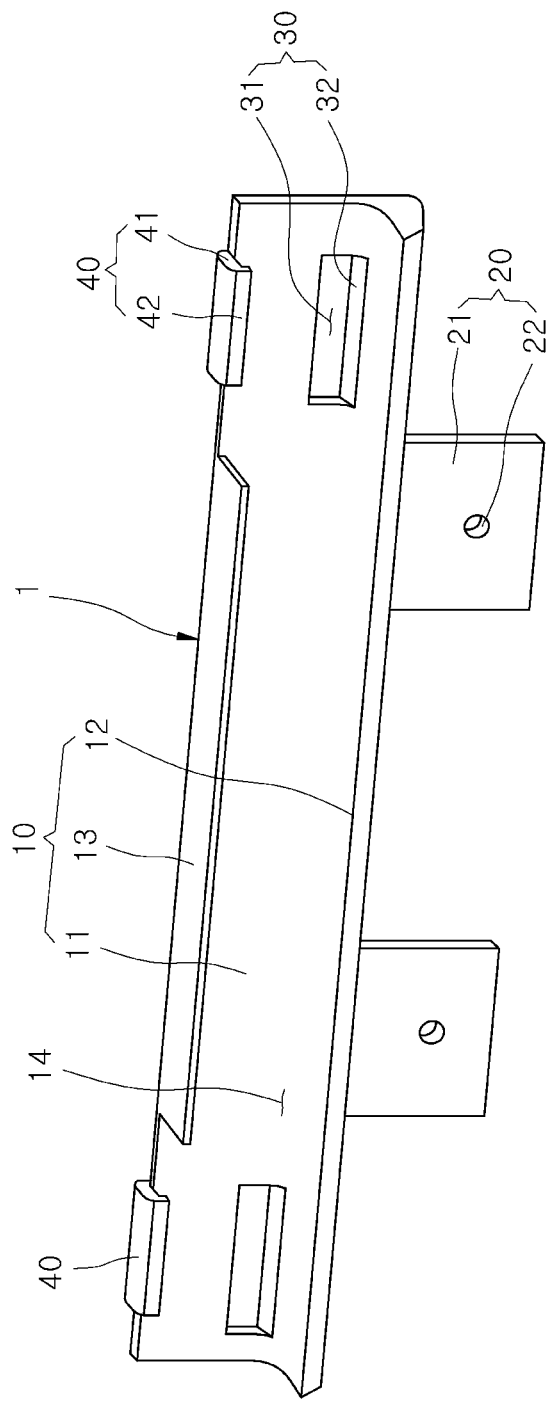
FIG. 2 is a perspective view schematically illustrating a ramp of the curtain airbag device in accordance with the embodiment of the present disclosure.

FIG. 2 is a perspective view schematically illustrating the ramp of the curtain airbag device in accordance with the embodiment of the present disclosure, FIG. 3 is a cross-sectional view taken along the line A-A' of FIG. 1, and FIG. 4 is a cross-sectional view taken along the line B-B' of FIG. 2.

Referring to 2 to 4, the ramp 1 in accordance with the embodiment of the present disclosure includes a ramp body part 10, a vehicle body mounting part 20, a tab through-hole part 30, a locking hook part 40 and a contact protrusion part 50.

The ramp body part 10 is a part constituting the basic frame of the ramp 1 which supports the cushion 2, and the middle portion of the folded cushion 2 is seated on or fitted into the ramp body part 10. The ramp body part 10 in accordance with the embodiment of the present disclosure includes a ramp base part 11, a cushion support part 12 and a cushion holding part 13.

The ramp base part 11 is a part disposed to face the vehicle body 3, has a upper-to-lower width corresponding to that of the folded cushion 2, and is extended in the front-to-rear direction. The ramp base part 11 has the tab through-hole part 30 formed therein. The cushion support part 12 is a part for supporting the cushion 2 from the lower part, is formed at the lower part of the ramp base part 11 so as to protrude toward the inside of the vehicle, and has the cushion 2 seated thereon.

The cushion holding part 13 is a part for supporting the cushion 2 from the upper part, is formed at the upper part of the ramp base part 11 so as to protrude toward the inside of the vehicle, and abuts on the upper part of the cushion 2. Among the ramp base part 11, the cushion support part 12 and the cushion holding part 13, a space 14 into which the cushion 2 can be inserted is formed. Between the cushion support part 12 and the cushion holding part 13, an opening O is formed to face the inside of the vehicle.

The cushion 2 is folded and inserted into the space 14 such that the middle portion thereof in the front-to-rear direction is supported by the ramp 1. When gas is introduced into the cushion 2, the cushion 2 is deployed to the inside of the vehicle through the opening O formed between the cushion support part 12 and the cushion holding part 13. According to the position, width and direction of the opening O formed between the cushion support part 12 and the cushion holding part 13, the deployment direction and position of the cushion 2 are adjusted.

Through the above-described process, the ramp 1 avoids interference with an interior part (not illustrated) of the vehicle, such as a pillar trim (not illustrated) disposed at the lower part of the vehicle body 3, and guides the cushion 2 to be deployed to a preset position in a preset direction away from the vehicle body 3.

The vehicle body mounting part 20 is a part for coupling and fixing the ramp body part 10 to a preset position on the vehicle body 3, and is formed at the lower part of the ramp body part 10 so as to protrude downward. The pair of vehicle body mounting parts 20 are disposed so as to be spaced apart from each other in the front-to-rear direction. The vehicle body mounting part 20 in accordance with the embodiment of the present disclosure includes a mounting body 21 and a fixing hole 22.

The mounting body 21 is formed at the lower part of the ramp body part 10 so as to extend downward, and has a plate shape to abut on the vehicle body 3. The fixing hole 22 is formed through the mounting body 21, fastened by a fastening member C such as a bolt, which passes through the fixing hole 22, and fixed to the vehicle body 3.

The tab through-hole part 30 is a part through which the mounting tab part 70 of the cushion 2 is passed, and is formed through the ramp body part 10. The pair of tab through-hole parts 30 are disposed so as to be spaced apart from each other in the front-to-rear direction. The tab through-hole part 30 in accordance with the embodiment of the present disclosure includes a tab extension hole 31 and an upward guide 32.

The tab extension hole 31 is formed through the ramp base part 11 of the ramp body part 10 toward the inside of the vehicle or in the lateral direction. The upward guide 32 is formed at the upper part and bottom of the tab extension hole 31 so as to be upward inclined toward the vehicle body 3. As the upward guide 32 is formed, the mounting tab part 70 is upward guided while passing through the tab extension hole 31.

The mounting tab part 70 may be upward extended through the tab through-hole part 30, while bent more gently by the upward guide 32. The mounting tab part 70 abuts on the upward guide 32 formed at the lower part of the tab extension hole 31 while passing through the tab through-hole part 30, and thus is naturally guided to be guided upward.

Furthermore, a corner (with no reference numeral) of the tab extension hole 31 is inclined more gently by the upward guide 32 formed at the upper part of the tab extension hole 31. The mounting tab part 70 is upward extended while contacted with an upper corner of the tab extension hole 31, and the upward guide 32 formed at the upper part of the tab extension hole 31 may further reduce the concentration of stress on one side of the mounting tab part 70.

The locking hook part 40 is a part to which an end of the mounting tab part 70 having passed through the tab through-hole part 30 is locked, and is formed at the upper part of the ramp body part 10. The mounting tab part 70 having passed through the tab through-hole part 30 is extended upward between the vehicle body 3 and the ramp body part 10, and has an end which is locked to the locking hook part 40 while bent toward the inside of the vehicle from the upper part of the locking hook part 40.

The pair of locking hook parts 40 are disposed so as to be spaced apart from each other in the front-to-rear direction. More specifically, the cushion holding part 13 is formed at the middle portion of the ramp base part 11 in the front-to-rear direction so as to extend in the front-to-rear direction, and the locking hook part 40 is disposed at the front and rear of the ramp base part 11 so as to be spaced apart from the cushion holding part 13.

Such a structure can stably support the mounting tab part 70 and the cushion 2 on both sides of the cushion holding part 13, while the cushion 2 can be stably held by the cushion holding part 13. The locking hook part 40 in accordance with the embodiment of the present disclosure includes a locking bump 41 and an unfolding prevention bump 42.

The locking bump 41 is formed at the upper part of the ramp body part 10 so as to protrude to the inside of the vehicle. The unfolding prevention bump 42 is formed at an end of the locking bump 41 so as to protrude downward. As an end of the mounting tab part 70 is fitted into the unfolding prevention bump 42, the mounting tab part 70 is inserted among the ramp body part 10, the locking bump 41 and the unfolding prevention bump 42, locked to the locking bump 41, and thus restrained from moving.

The contact protrusion part 50 is formed at the lower part of the ramp body part 10, abutting on the vehicle body 3, so as to protrude toward the vehicle body 3. The contact protrusion part 50 is disposed under the tab through-hole part 30 so as not to interfere with the mounting tab part 70 of the cushion 2. As the contact protrusion part 50 is formed, the ramp 1 and the vehicle body 3 may be reliably contacted with each other at a position under the mounting tab part 70, corresponding to the contact protrusion part 50, and prevent noise from being generated by the gap between the ramp 1 and the vehicle body 3.

Figure 5:
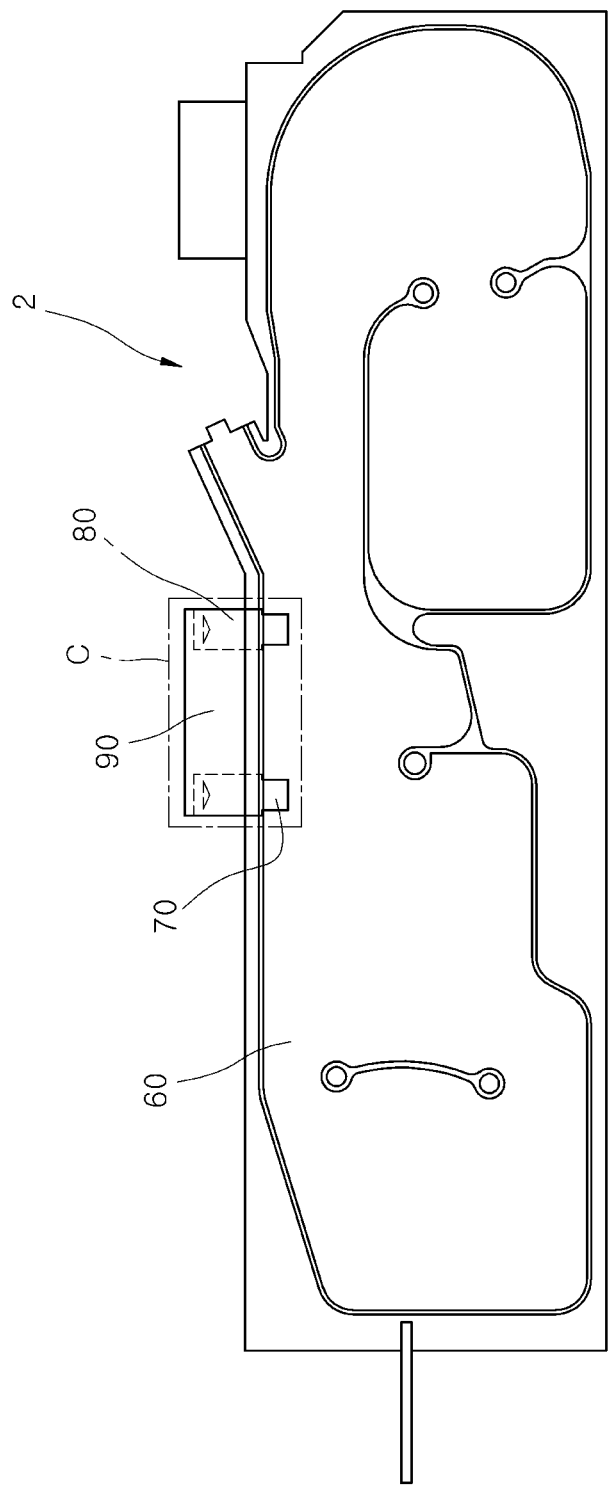
FIG. 5 is a side view schematically illustrating a cushion of the curtain airbag device in accordance with the embodiment of the present disclosure.
Figure 6:
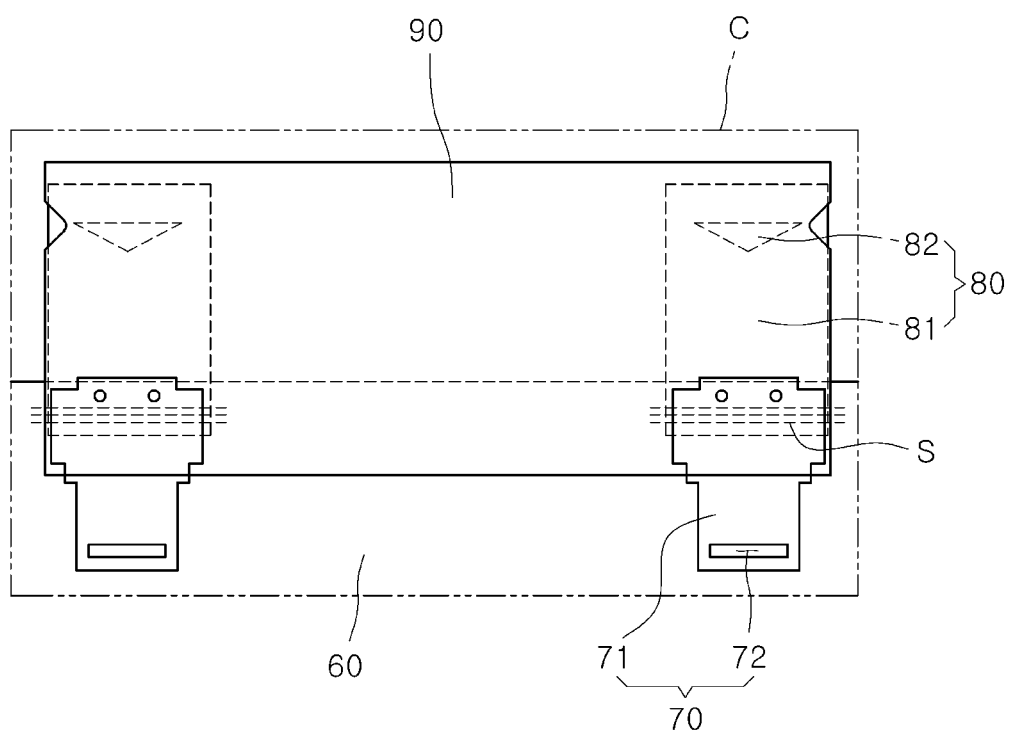
FIG. 6 is an expanded view of a portion C illustrated in FIG. 5.
Figure 7:
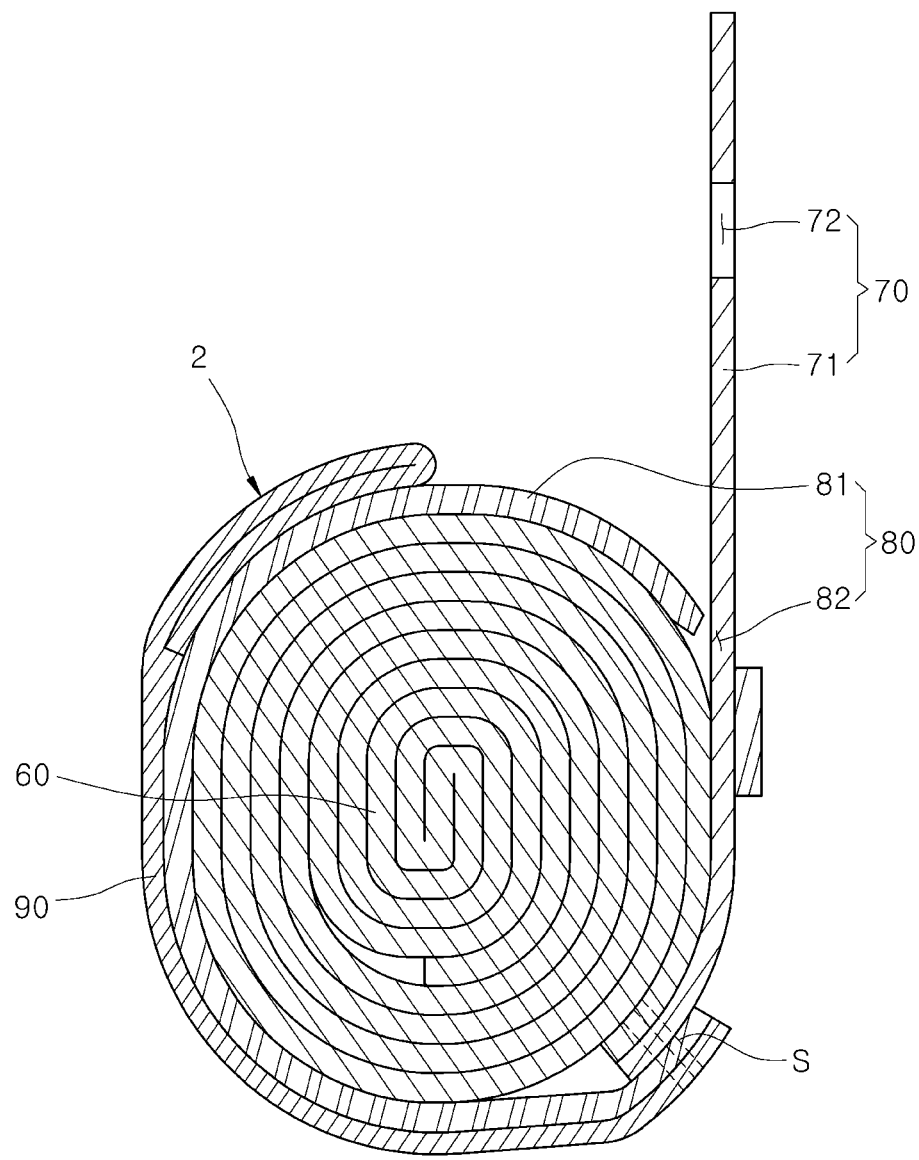
FIG. 7 is a conceptual view for describing a folding structure of the cushion of the curtain airbag device in accordance with the embodiment of the present disclosure.

FIG. 5 is a side view schematically illustrating the cushion of the curtain airbag device in accordance with the embodiment of the present disclosure, FIG. 6 is an expanded view of a portion C illustrated in FIG. 5, and FIG. 7 is a conceptual view for describing a folding structure of the cushion of the curtain airbag device in accordance with the embodiment of the present disclosure.

Referring to FIGS. 5 to 7, the cushion 2 in accordance with the embodiment of the present disclosure includes a cushion body part 60, the mounting tab part 70, a strap part 80 and a fabric ramp 90.

The cushion body part 60 is a part for forming an air cushion to protect the head and upper body of a passenger, is extended in the front-to-rear direction of the vehicle, and folded and disposed at a side top of the passenger. In case of a collision accident of the vehicle, the cushion body part 60 is deployed by gas injected from the inflator as illustrated in FIG. 5.

The cushion body part 60 is not limited to the shape illustrated in FIG. 5, but may have various deployment shapes depending on the specification of the vehicle and the body condition of a passenger. The cushion body part 60 is not limited to a specific structure and shape, as long as the cushion body part 60 can implement the function of the cushion to protect the body of the passenger. Thus, the detailed descriptions of the structure and operation thereof will be omitted herein.

The mounting tab part 70 is a part for fastening the cushion body part 60 to the ramp 1, and is formed in a band shape at the upper part of the cushion body part 60, extended upward between the ramp 1 and the vehicle body 3 through the tab through-hole part 30 of the ramp 1, and has an end locked and fastened to the locking hook part 40 of the ramp 1. The mounting tab part 70 in accordance with the embodiment of the present disclosure includes a tab body 71 and a locking hole 72.

The tab body 71 is coupled in a band shape to the upper part of the cushion body part 60, and extended upward between the ramp 1 and the vehicle body 3 through the tab through-hole part 30. The locking hole 72 is formed through an end of the tab body 71, and locked to the locking hook part 40. The tab body 71 may be passed through the tab through-hole part 30 and the locking hole 72 may be locked and fastened to the locking hook part 40, which makes it possible to prevent the movement of the cushion body part 60.

The mounting tab part 70 is formed of a fabric material or the like, and serves to prevent direct contact or friction between the ramp 1 and the vehicle body 3 which are formed of synthetic resin or metal, while extended between the ramp 1 and the vehicle body 3 as described above. Therefore, according to the fastening structure between the mounting tab part 70 and the ramp 1, the mounting tab part 70 can serve as a buffer between the ramp 1 and the vehicle body 3, and simultaneously prevent noise from being generated by direct contact between the ramp 1 and the vehicle body 3.

The strap part 80 is a part for covering the circumference of the cushion body part 60 folded with the mounting tab part 70, and is coupled to the upper part of the cushion body part 60. With the cushion body part 60 unfolded as illustrated in FIG. 5, the strap part 80 is disposed at the upper part of the mounting tab part 70 so as to extend upward. The strap part 80 is disposed so that a lower portion thereof overlaps an upper portion of the mounting tab part 70. The strap part 80 in accordance with the embodiment of the present disclosure includes a strap body 81 and a tab cross hole 82.

The strap body 81 is coupled in a band shape to the upper portion of the cushion body part 60. As illustrated in FIG. 7, the strap body 81 is extended upward to cover one side of the cushion body part 60, facing the inside of the vehicle, and then extended downward toward the other side of the cushion body part 60, facing the outside of the vehicle. Furthermore, the strap body 81 crosses the mounting tab part 70 extended upward between the cushion body part 60 and the ramp 1.

The tab cross hole 82 is formed through a portion of the strap body 81, crossing the mounting tab part 70. The mounting tab part 70 is extended upward toward the tab through-hole part 30 through the tab cross hole 82, and has an end fastened to the locking hook part 40. According to such a cross fastening structure between the mounting tab part 70 and the strap part 80, the mounting tab part 70 and the strap part 80 constrain the cushion body part 60 from being unfolded, while covering the circumference of the cushion body part 60 in all directions.

The fabric ramp 90 is a part for covering one side of the cushion body part 60, exposed to the outside of the ramp 1, i.e., one side of the cushion body part 60, facing the inside of the vehicle, and is formed on the cushion body part 60 so as to have a front-to-rear width corresponding to the ramp 1. The fabric ramp 90 may cover the strap part 80 and one side of the cushion body part 60, exposed to the outside through the opening O of the ramp 1, and stably prevent the cushion body part 60 from being unfolded or separated.

In FIG. 6, the cushion body part 60, the mounting tab part 70, the strap part 80 and the fabric ramp 90 may be sequentially disposed from the front so as to make four layers. The cushion body part 60, the mounting tab part 70, the strap part 80 and the fabric ramp 90 are stacked on the same horizontal line, such that the four layers are simultaneously fastened and fixed by the same sewing line S.

According to the ramp 1 of a curtain airbag device and the curtain airbag device having the same, which have the above-described structures, the mounting tab part 70 of the cushion 2 may be passed through the tab through-hole part 30 of the ramp 1, and locked and fastened to the locking hook part 40 formed at the upper part of the ramp 1, thereby stably preventing the movement of the cushion body part 60 mounted on the ramp 1.

Furthermore, the mounting tab part 70 formed of a fabric material or the like may be extended between the ramp 1 and the vehicle body 3, thereby preventing direct contact or friction between the ramp 1 and the vehicle body 3 which are formed of synthetic resin or metal. Therefore, the mounting tab part 70 can prevent noise from being generated by the contact between the ramp 1 and the vehicle body 3, while serving as a buffer between the ramp 1 and the vehicle body 3.

In accordance with the embodiment of the present disclosure, as the tab through-hole part 30 is disposed at a position which is clearly spaced apart from the lower part of the ramp body part 10 having the vehicle body mounting part 20 formed thereon, the rigidity of the lower portion of the ramp 1 including the vehicle body mounting part 20 can be stably secured. Therefore, the thickness does not need to be increased, and a separate rigidity reinforcement structure such as a rib may be omitted, which makes it possible to reduce the weight and cost thereof.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A ramp of a curtain airbag device, comprising:
a ramp body part on or into which a folded cushion is seated or inserted;
one or more vehicle body mounting parts arranged at a lower part of the ramp body part, and coupled to a vehicle body;
one or more tab through-hole parts formed in the ramp body part and configured to pass a mounting tab part of the cushion through the tab through-hole part; and
one or more locking hook parts formed at an upper part of the ramp body part and configured to lock an end of the mounting tab part extended upward between the vehicle body and the ramp body part through the tab through-hole part to the locking hook part.

2. The ramp of the curtain airbag device of claim 1, wherein the ramp body part comprises:
a ramp base part facing the vehicle body and having the tab through-hole part formed therethrough;
a cushion support part formed at a lower part of the ramp base part and protruding toward an inside of the vehicle, and having the cushion seated thereon; and
a cushion holding part arranged at an upper part of the ramp base part and protruding toward the inside of the vehicle; and
the cushion holding part is configured to form a space between the cushion support part and the cushion holding part, into which the cushion is inserted, and to abut on an upper part of the cushion.

3. The ramp of the curtain airbag device of claim 2, wherein:
the cushion holding part is disposed at a middle portion of the ramp base part in a front-to-rear direction; and
the locking hook part is disposed on at least one side of a front side and a rear side of the ramp base part so as to be spaced apart from the cushion holding part.

4. The ramp of the curtain airbag device of claim 1, wherein the vehicle body mounting part comprises:
a mounting body formed at the lower part of the ramp body part and extending downward, and abutting the vehicle body; and
a fixing hole formed through the mounting body, and fastened by a fastening member so as to be fixed to the vehicle body.

5. The ramp of the curtain airbag device of claim 1, wherein the tab through-hole part comprises:
a tab extension hole formed through the ramp body part; and
one or more upward guides formed on at least one part of an upper part and a lower part of the tab extension hole and arranged to be upward inclined toward the vehicle body.

6. The ramp of the curtain airbag device of claim 1, wherein:
the locking hook part comprises:
a locking bump arranged at an upper part of the ramp body part and protruding to an inside of the vehicle; and
an unfolding prevention bump arranged at an end of the locking bump and protruding downward; and
an end of the mounting tab part is fitted and locked between the locking bump and the ramp body part.

7. The ramp of the curtain airbag device of claim 1, further comprising one or more contact protrusions arranged on the ramp body part, protruding toward the vehicle body, and abutting on the vehicle body under the tab through-hole part.

8. A curtain airbag device having a ramp of a curtain airbag device comprising:
one or more ramps each comprising one or more vehicle mounting parts arranged at a lower part of a ramp body part, one or more tab through-hole parts formed through the ramp body part, and one or more locking hook parts formed at an upper part of the ramp body part; and
a cushion comprising a cushion body part folded and seated on or fitted into the ramp body part, and one or more mounting tab parts each extended between a vehicle body and the ramp through the tab through-hole part, and locked to the locking hook part.

9. The curtain airbag device having the ramp of the curtain airbag device of claim 8, wherein the mounting tab part comprises:
a tab body coupled to the cushion body part, and extended upward between the ramp and the vehicle body through the tab through-hole part; and
a locking hole formed through an end of the tab body, and locked to the locking hook part.

10. The curtain airbag device having the ramp of the curtain airbag device of claim 8, wherein the cushion further comprises one or more strap parts coupled to the cushion body part, and configured to cover a circumference of the cushion body part folded with the mounting tab.

11. The curtain airbag device having the ramp of the curtain airbag device of claim 10, wherein the strap part comprises:
a strap body coupled to the cushion body part, extended to cover one side of the cushion body part, facing an inside of the vehicle, and crossing the mounting tab part extended toward the tab through-hole part; and
a tab cross hole formed through a portion of the strap body, which crosses the mounting tab part, such that the mounting tab part passes through the tab cross hole.

12. The curtain airbag device having the ramp of the curtain airbag device of claim 8, wherein the cushion further comprises one or more fabric ramps coupled to the cushion body part, and extended to cover one side of the cushion body part, exposed to an outside of the ramp.

* * * * *